(12) United States Patent
Sugiyama et al.

(10) Patent No.: US 6,264,565 B1
(45) Date of Patent: Jul. 24, 2001

(54) TRIPOD TYPE CONSTANT VELOCITY UNIVERSAL JOINT

(75) Inventors: Tatsurou Sugiyama, Iwata; Tatsuhiro Goto, Shizuoka-ken; Shigeyoshi Ishiguro, Kakegawa; Kenji Terada, Shizuoka-ken; Hisaaki Kura, Iwata, all of (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/468,200

(22) Filed: Dec. 20, 1999

(30) Foreign Application Priority Data

Dec. 22, 1998 (JP) .................................................. 10-365101
May 19, 1999 (JP) .................................................. 11-138988

(51) Int. Cl.$^7$ ........................................................ F16D 3/26
(52) U.S. Cl. ................................................ 464/111; 464/905
(58) Field of Search ...................................... 464/905, 111, 464/128, 125

(56) References Cited

U.S. PATENT DOCUMENTS

| 4,589,856 | * | 5/1986 | Mazzioti et al. ....................... 464/111 |
| 5,203,741 | * | 4/1993 | Turner et al. .......................... 464/111 |
| 5,267,901 | * | 12/1993 | Jost et al. ............................... 464/111 |
| 5,330,389 | * | 7/1994 | Jost et al. ............................... 464/111 |
| 5,391,013 | * | 2/1995 | Ricks et al. ............................ 464/111 |
| 5,507,693 | * | 4/1996 | Schwarzler et al. .................. 464/111 |
| 5,571,047 |   | 11/1996 | Stall et al. . |

* cited by examiner

*Primary Examiner*—Lynne H. Browne
*Assistant Examiner*—Aaron Dunwoody
(74) *Attorney, Agent, or Firm*—Arent Fox Kintner Plotkin & Kahn, PLLC

(57) ABSTRACT

In a tripod type constant velocity universal joint having a roller (28) carried by each of three trunnions (25) of an inner joint member (24) and accommodated in one of three guide grooves (22) of an outer joint member (21) so that the roller (28) rolls along track surfaces (23) of the corresponding guide groove on its convex outer periphery, cooperating surface portions (31*a* and 31*b*) and/or (32*a* and 32*b*) being provided, which come in contact with each other when the roller (28) is about to tilt in a plane perpendicular to the axis of the outer joint member.

12 Claims, 10 Drawing Sheets

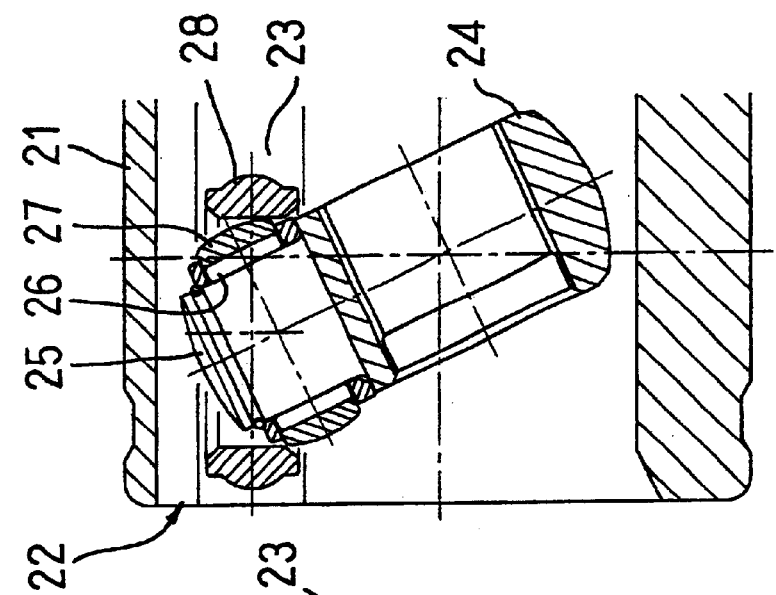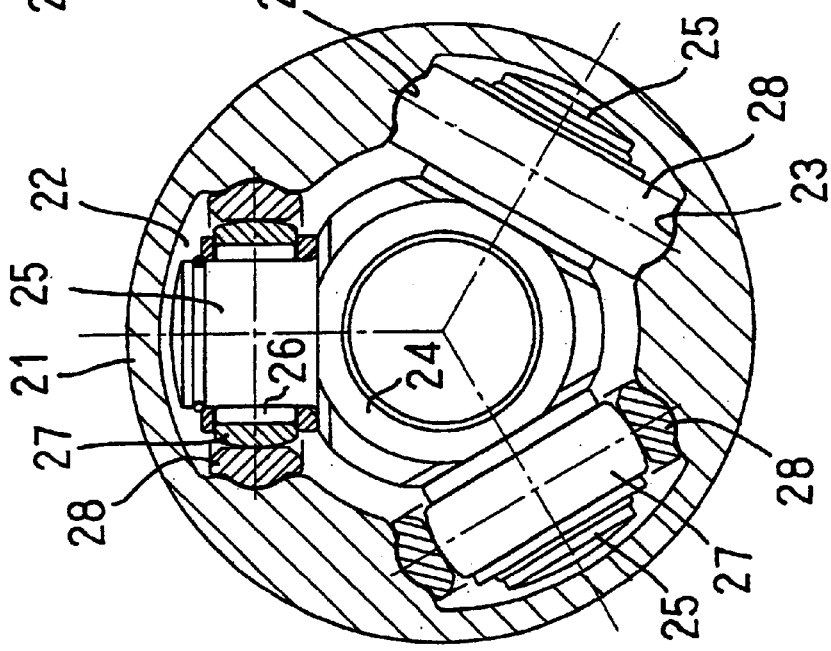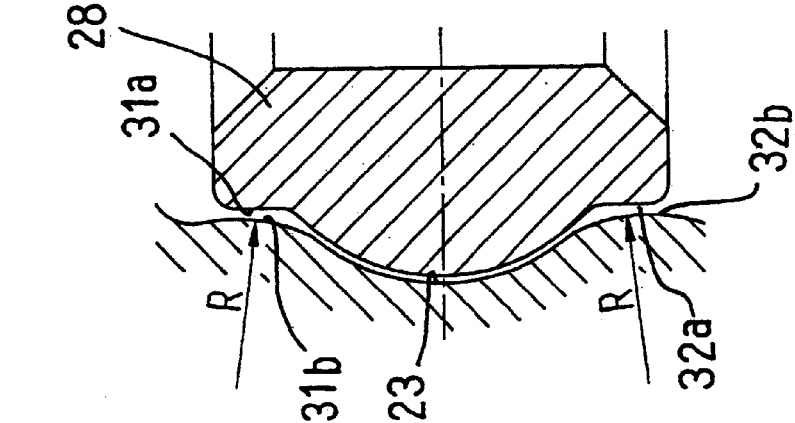

TRIPOD TYPE CONSTANT VELOCITY UNIVERSAL JOINT

BACKGROUND OF THE INVENTION

The present invention relates to a tripod type constant velocity universal joint for use in, but not exclusively, a front-wheel drive automobile.

An example of the tripod type constant velocity universal joint for transmission of torque from a driveshaft of a front-wheel drive automobile to a front wheel at a constant velocity is shown in FIGS. 9A to 9C. The joint shown comprises a cup-shaped outer joint member 1 having three axially extending part-cylindrical guide grooves 2 equally spaced in its inner periphery and an inner joint member, or tripod member, 4 inserted in the outer joint member and having three trunnions 5 projecting radially outwardly of the inner joint member 4. A roller 7 is rotatably carried by each trunnion 5 through a series of rolling elements 6 and is received in the corresponding guide groove 2 of the outer joint member 1. The guide groove 2 forms a pair of circumferentially opposing track surfaces 3 parallel to a rotational axis of the outer joint member. An outer periphery of the roller 7 in section is convex and complementary to the track surface 3. Each roller 7 is movable within the corresponding guide groove 2 while rolling along the track surfaces 3 and rotating about the trunnion 5.

When the joint transmits torque with the outer and inner joint members 1 and 4 at a working angle of θ as shown in FIG. 9B, the roller 7 tilts relative to the track surface 3 as shown in FIG. 9C. In this case, the roller 7 is about to roll in the direction indicated by arrow t in FIG. 9B, but since the track surface 3 extends parallel to the axis of the outer joint member, the roller 7 actually has to slide while being restrained by the track surface 3. This leads to scuffing of the roller 7 as it moves along the track surface 3, producing not only frictional heat but also a greater frictional resistance and accordingly an induced thrust in the axial direction. Such induced thrust causes vibration and noise of the car body, and should preferably be reduced as much as possible.

In the tripod type constant velocity universal joint various attempts have been made to reduce the induced thrust, and some examples are shown in FIG. 10 to FIG. 12.

FIG. 10 shows a dual-roller arrangement in which an inner roller 11 is rotatably fitted externally on a cylindrical outer periphery of a trunnion 5a of an inner joint member 4a through a plurality of rolling elements 6a, and a cylindrical inner periphery of an outer roller 12 is rotatably fitted externally on an outer periphery of the inner roller 11. The outer periphery of the inner roller 11 is a truly part-spherical surface having its center on the axis of the trunnion 5a, and the inner periphery of the outer roller 12 slides on this truly part-spherical surface, so that the outer roller 12 is tiltable relative to the trunnion 5a. The outer roller 12 is received in a guide groove 2a of an outer joint member 1a, and is movable axially of the outer joint member while rolling along track surfaces 3a of the guide groove 2a. When the joint transmits torque with the outer and inner joint members 1a and 4a at a working angle, the trunnion 5a together with the inner roller 11 tilts relative to the outer roller 12, while the outer roller 12 is guided by the track surfaces 3a of the outer joint member 1a so as to keep a position parallel to the axis of the outer joint member 1a, correctly rolling along the track surfaces 3a. Therefore, the frictional resistance and induced thrust are reduced to a certain extent.

In the joint shown in FIG. 11, an outer periphery of a trunnion 5b of an inner joint member 4b is substantially part-spherical, and an annular roller 13 is rotatably and tiltably fitted externally on this part-spherical outer periphery through a plurality of rolling elements 6b. When this joint transmits torque with the outer and inner joint members 1b and 4b at a working angle, the trunnion 5b tilts relative to the roller 13, while the roller 13 is guided by track surfaces 3b at opposite sides of a guide groove 2b of the outer joint member 1b so as to keep a position parallel to the axis of the outer joint member 1b, correctly rolling along the track surfaces 3b. In this case, too, the frictional resistance and induced thrust are reduced to a certain extent.

The basic structure of the joint shown in FIG. 12 is the same as that of the joint shown in FIG. 11, that is, an outer periphery of a trunnion 5c of an inner joint member 4c is truly part-spherical, and an annular roller 14 is rotatably and tiltably fitted externally on this truly part-spherical periphery through a plurality of rolling elements 6c. In this joint, too, when transmitting torque with the outer and inner joint members 1c and 4c at a working angle, the trunnion 5c tilts relative to the roller 14, while the roller 14 is guided by track surfaces 3c at opposite sides of a guide groove 2c of the outer joint member 1c so as to keep a position parallel to the axis of the outer member 1c, correctly rolling along the track surfaces 3c, and therefore the frictional resistance induced thrust are reduced to a certain extent.

In the known arrangements as mentioned above, however, as the joint rotates for transmission of torque between the outer and inner joint members and the roller of the inner joint member moves along the corresponding guide groove of the outer joint member, the roller is pressed against either one of the track surfaces at opposite sides of the guide groove, which can cause the roller to tilt as viewed in a cross section perpendicur to the axis of the outer joint member between the track surfaces. This will now be described in relation to the outer roller 12 of the joint shown in FIG. 10. As shown in FIG. 13 which is an enlarged view in part of FIG. 10, when torque is transmitted as the roller 12 is relatively pressed against the left track surface 3L, there is a slight clearance between the roller 12 and the right track surface 3R. Accordingly, the non-load side 12n diametrically opposite to the loaded side 12m of the roller 12 can be raised or lowered, with the fulcrum at the outer peripheral central part P.

When the roller 12 tilts radially outwardly of the outer joint member 1a as indicated by solid line in FIG. 13, the roller 12 comes in contact with a shoulder 8a formed in the guide groove 2a at its end surface on the non-loaded side 12n, producing a frictional resistance. The shoulders 8a extend parallel to the axis of the outer joint member along the right and left track surfaces 3R and 3L in order to prevent the roller 12 from tilting within the guide groove in the plane including the axis of the outer joint member. Similar shoulders are provided as required in the joints of FIG. 11 and FIG. 12. On the contrary, when the roller 12 tilts radially inwardly of the outer joint member 1a as indicated by chain line in FIG. 13, the outer periphery of the roller on the non-load side 12n comes in contact with the right track surface 3R as at S, where a frictional resistance is produced.

The frictional resistance caused by the tilting of the roller 12 is considered to be one of the causes for worsening the induced thrust or slide resistance in the tripod type constant velocity universal joint, and should desirably be reduced as much as possible. However, its reduction has heretofore been limited to such an extent that accuracy in manufacturing and assembling parts permits. Similar problems can also arise in the roller 13 in the joint of FIG. 11 or the roller 14 in the joint of FIG. 12.

It is hence a primary object of the invention to provide a tripod type constant velocity universal joint with the induced thrust and slide resistance substantially reduced by suppressing tilting movements of the roller of the inner joint member in the guide groove of the outer joint member.

SUMMARY OF THE INVENTION

According to the invention, a tripod type constant velocity universal joint comprises an outer joint member having three equally spaced guide grooves extending parallel to a rotational axis thereof, each of the guide grooves forming circumferentially opposed tracks, an inner joint member disposed inside the outer member and having three equally spaced trunnions projecting radially outwardly into the guide grooves, and an annular roller rotatably and tiltably carried by each of the trunnions, wherein a convex part-spherical outer periphery of the annular roller is engageable with the tracks of the corresponding guide groove so that the roller rolls therealong, and wherein cooperating rest surfaces for preventing the annular roller from tilting in a plane perpendicular to the axis of the outer joint member are provided at, respectively, an end portion of the annular roller and a portion of the track surface corresponding to said end portion of the roller.

The cooperating rest surfaces respectively formed on the annular roller and the track surface constitute a steady rest effective for suppressing the tilting of the annular roller. That is, when force is transmitted between the track surface of the outer joint member and the trunnion of the inner joint member through the annular roller, if the annular roller is to tilt for some reason, the rest surface of the annular roller abuts against the rest surface of the track surface, so that the tilting of the annular roller is limited to a minimum. The rest surface of the annular roller rolls on the track surface, without making contact to cause sliding friction as experienced in the prior art, and therefore the annular roller is allowed to smoothly roll without an increase in the slide resistance of the joint. Thus, the tilting of the annular roller is suppressed, which results in the slide resistance and induced thrust being further reduced.

According to the invention, therefore, when loaded for transmission of torque between the outer and inner joint members as the roller of the inner joint member is pressed against one of the opposing track surfaces in the corresponding guide groove of the outer joint member, if the roller is about to tilt so as to raise or lower the non-load side thereof with the loaded side being pressed against the track surface, the tilting of the roller is limited to a minimum by cooperation of the rest surfaces, which prevents the roller non-load side from touching the corresponding track surface so that the contact resistance and sliding resistance of the non-load side are decreased or eliminated. Thus, the joint according to the invention has induced thrust and slide resistance substantially reduced to be of low level of vibration or noise and high performance.

The annular roller needs not have the rest surface at both ends thereof necessarily, but may have the rest surface at its one end only, e. g. where the annular roller always tilts in one particular direction.

One form of the annular roller rotatable about and tiltable relative to the trunnion is an outer roller having a concave part-spherical inner periphery which is externally fitted rotatably and tiltably on a convex part-spherical outer periphery of an inner roller rotatably fitted on a cylindrical outer periphery of the trunnion through rolling elements. Another is an annular roller having a cylindrical inner periphery which is externally fitted on a substantially part-spherical outer periphery of the trunnion through rolling elements. In the case of the former, further, the center of the convex part-spherical outer periphery of the outer roller may be positioned away from the center of the convex part-spherical outer periphery of the inner roller on the axis of the trunnion. Thus, such arrangement of the centers determines the direction in which the outer roller can tilt in a cross section perpendicular to the axis of the outer joint member, and therefore the outer roller is only required to have the rest surface on one of the opposite ends thereof depending on that direction to be determined.

The pair of cooperating rest surfaces in section may be both straight, or a combination of straight and curved lines. For example, the generatrix of the outer periphery of the annular roller is composed of a convex arc and a straight line, while the sectional shape of the track surface is composed of concave and convex arcs. Alternatively, the generatrix of the outer periphery of the annular roller is composed of a convex arc of a larger radius of curvature and a convex arc of a smaller radius of curvature, while the sectional shape of the roller guide surface is composed of a concave arc and a straight line. Thus, the area of contact between the cooperating rest surfaces decreases, so that as the annular roller moves in the guide groove with the rest surfaces in contact, little sliding friction is generated, and the slide resistance is expected to decrease further.

BRIEF DESCRIPTION OF THE DRAWINGS

Preferred embodiments of the invention will be described with reference to the drawings, in which:

FIG. 7A is a cross sectional view showing a further different embodiment of the invention;

FIG. 7B is a longitudinal sectional view of the joint shown in FIG. 7A in an articulated state;

FIG. 7C is an enlarged sectional view of the rest surfaces;

DESCRIPTION OF THE PREFERRED EMBODIMENTS

Figure 1A:
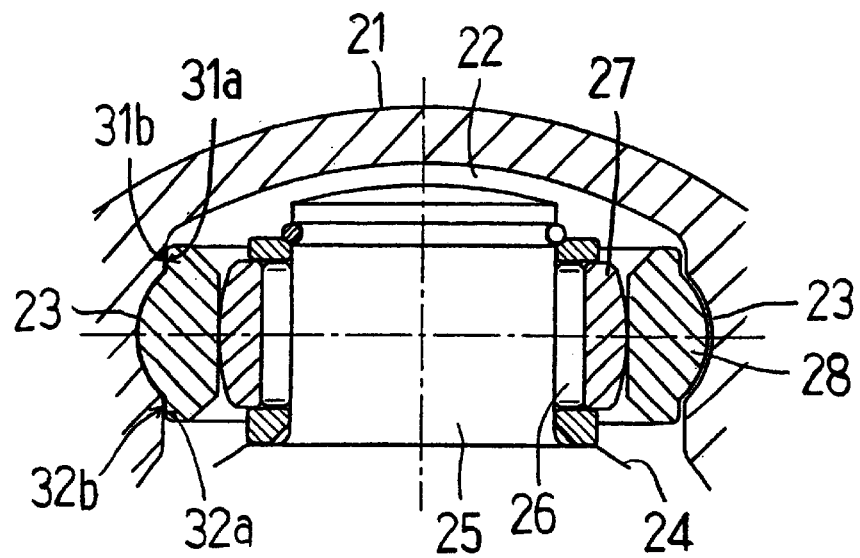
FIGS. 1A and 1B are partial sectional views showing embodiments of the invention, respectively.
Figure 10:
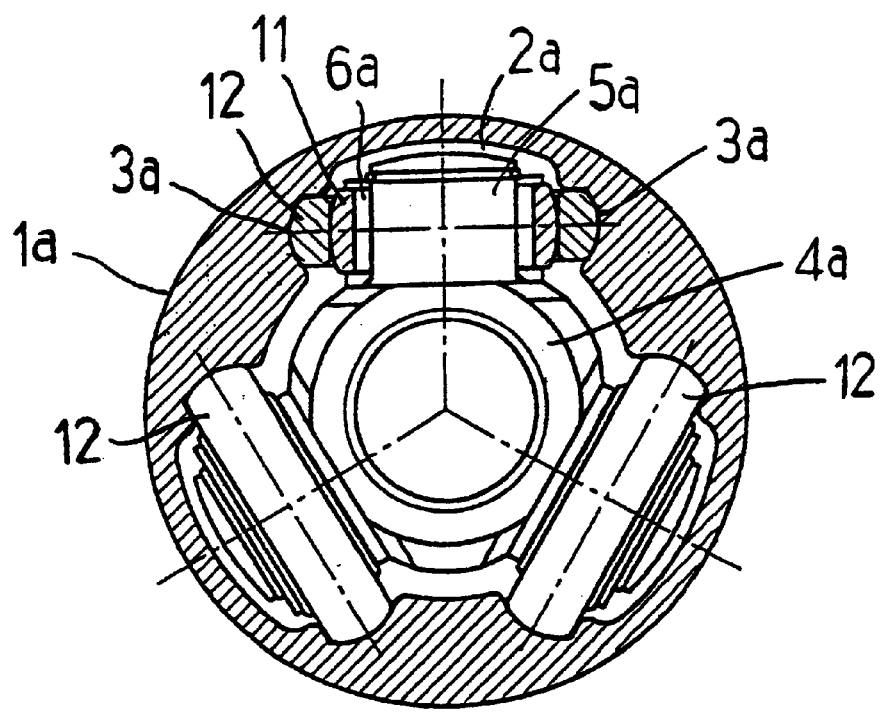
FIG. 10 is a cross sectional view of a conventional tripod type constant velocity universal joint.

The embodiment shown in FIG. 1A is applied to the joint shown in FIG. 10, and as already mentioned in relation to FIG. 10, an outer roller 28 supported on a trunnion 25 of an inner joint member, or tripod member, 24 is received in a guide groove 22 of an outer joint member 21. An annular inner roller 27 is coaxially received in the outer roller 28 and is rotatably supported on a cylindrical outer periphery of the trunnion 25 through a plurality of rolling elements 26. An outer periphery of the inner roller 27 is part-spherical, while an inner periphery of the outer roller 28 is cylindrical, so that the rollers are fitted for relative rotation, relative tilting and relative movement in the axial direction. The center of the part-spherical outer periphery of the inner roller 27 is on the axis of the trunnion 25, and the outer roller 28 is tiltable along this part-spherical outer periphery. The inner periphery of the outer roller 28 may be formed in a conical surface converging upward or radially outwardly of the outer joint member, which ensures a lesser fluctuation of induced thrust. The cone angle of the conical surface is preferably in a range of 0.1 deg. to 3 deg. The outer periphery of the outer roller 28 is a convex surface, to which the track surface 23 in section is complementary. This basic structure is the same as the joint previously described and shown in FIG. 10, and therefore will not be again described in detail.

In FIG. 1A through FIG. 6B, it is assumed that torque is transmitted as the outer joint member rotates clockwise or the inner joint member rotates counterclockwise.

Figure 2:
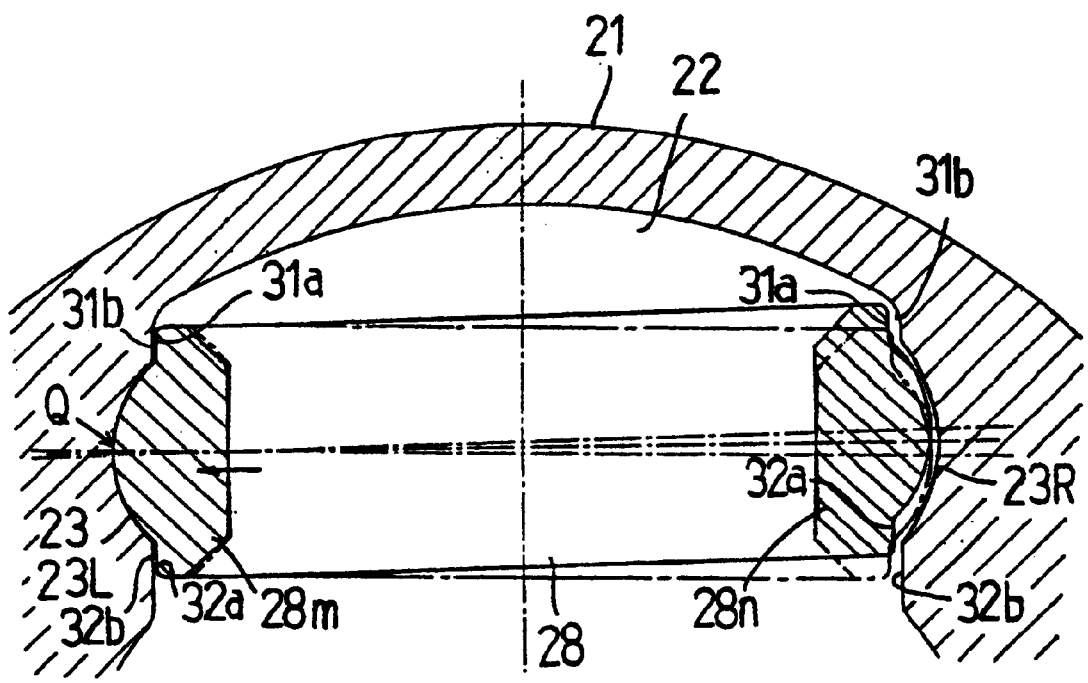
FIG. 2 is an enlarged sectional view of the outer ring and roller of the joint shown in FIG. 1A.

FIG. 2 shows an enlarged view in part of FIG. 1A. As shown, the outer periphery of the outer roller 28 and the track surface 23 are complementary in section, the former having a central arcuate portion and rest surfaces 31a and 32a at both sides thereof, the latter having a central arcuate portion and rest surfaces 31b and 32b at both sides thereof. The rest surfaces 31a and 32a of the outer roller 28 are cylindrical, while the rest surfaces 31b and 32b of the track surface 23 are flat. Under a loaded condition where transmission of torque takes place as the outer roller 28 is relatively pressed against the left track surface 23L, a slight clearance is formed between the outer roller 28 and the right track surface 23R. Accordingly, the non-load side 28n diametrically opposite to the loaded side 28m of the outer roller 28 can be raised or lowered with the fulcrum at the outer peripheral central part Q of the outer roller 28 on the loaded side 28m.

When the outer roller 28 is to tilt radially outwardly of the outer joint member to raise the non-load side 28n thereof as indicated by solid line in FIG. 2, the rest surface 31a situated radially outwardly of the outer joint member and at the loaded side 28m of the outer roller 28 abuts against the rest surface 31b of the left track surface 23L to prevent any further tilting of the outer roller 28. Thus, the non-load side 28n of the outer roller 28 is slightly away from the right track surface 23R, without any contact resistance and sliding resistance being produced. The dimensions of the rest surfaces 31a and 31b should be set so that the non-load side of the outer roller will not touch the outer joint member even if the outer roller 28 somewhat tilts.

When the outer roller 28 is to tilt radially inwardly of the outer joint member to lower the non-load side 28n thereof as indicated by chain line in FIG. 2, the rest surface 31a situated radially inwardly of the outer joint member and at the loaded side 28m of the outer roller 28 abuts against the rest surface 32b of the left track surface 23L to prevent any further tilting of the outer roller 28. Thus, the non-load side 28n of the outer roller 28 is slightly away from the right track surface 23R, without any contact resistance and sliding resistance being produced. The dimensions of the rest surfaces 32a and 32b should be so set that the non-load side of the outer roller will not touch the outer joint member even if the outer roller 28 somewhat tilts.

When the outer roller 28 somewhat tilts, the rest surface 31a or 32a on the loaded side 28m and the rest surface 31b or 32b of the left track surface 23L come in contact with each other, but since the rest surfaces 31a and 32a of the outer roller 28 are cylindrical, they roll on the respective flat rest surfaces 31b and 32b of the track surface 23L with a very slight rolling resistance which does not affect induced thrust. Accordingly, the tilting of the outer roller 28 under a loaded condition is suppressed to a very slight amount, and induced thrust or slide resistance are substantially reduced. The above described function is applicable to the subsequent embodiments as well.

Figure 1B:
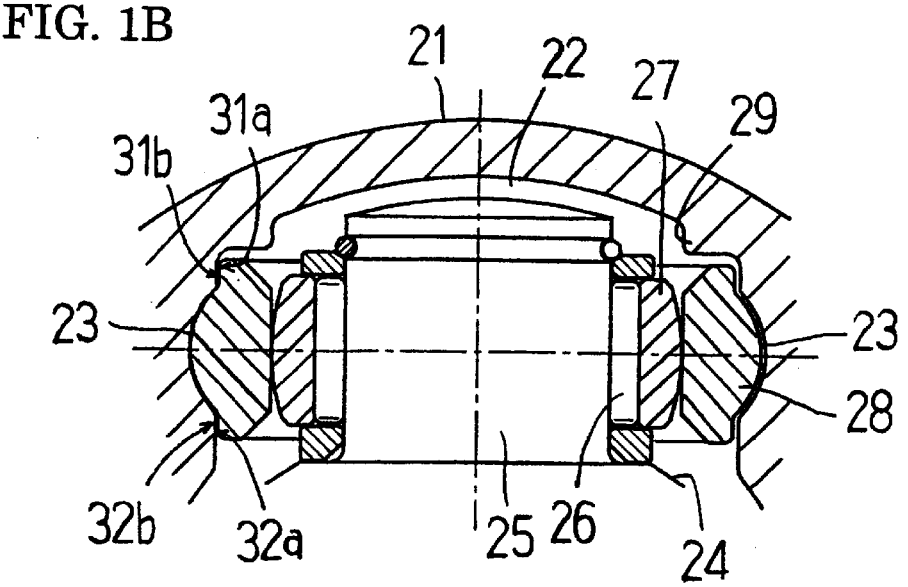

FIG. 1B shows a modification in which axially extending parallel shoulders 29 are formed in the guide groove 22 of the outer joint member 21 for preventing the outer roller 28 from tilting as viewed in the plane including the axis of the outer joint member 21. In this modified embodiment, the outer roller 28 under a loaded condition is prevented from not only tilting in the plane perpendicular to the axis of the outer joint member but also tilting in the plane including the axis of the outer joint member, so that induced thrust and slide resistance may be further reduced.

Figure 3A:
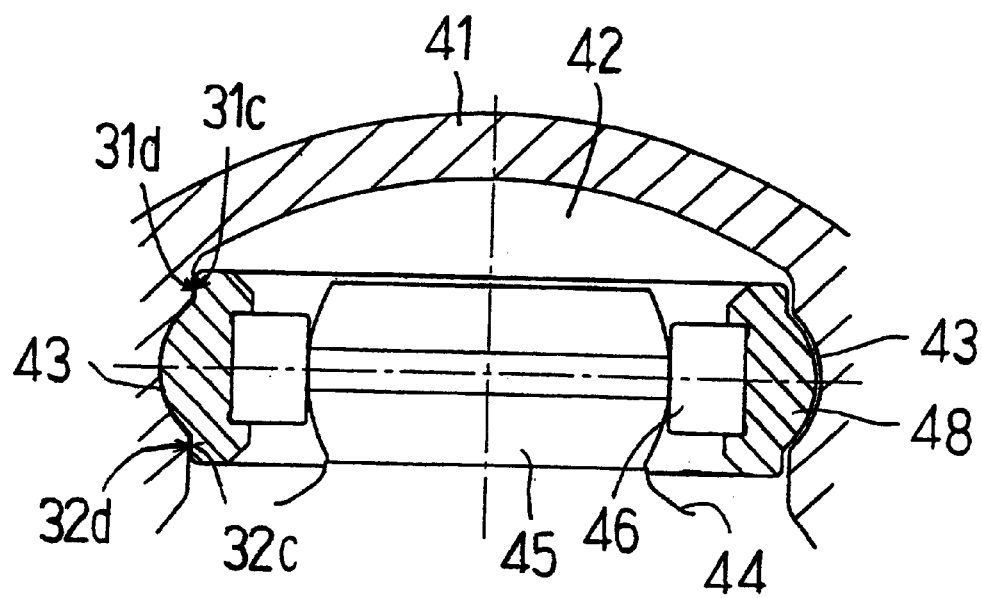
FIGS. 3A and 3B are partial sectional views showing different embodiments of the invention, respectively.
Figure 3B:
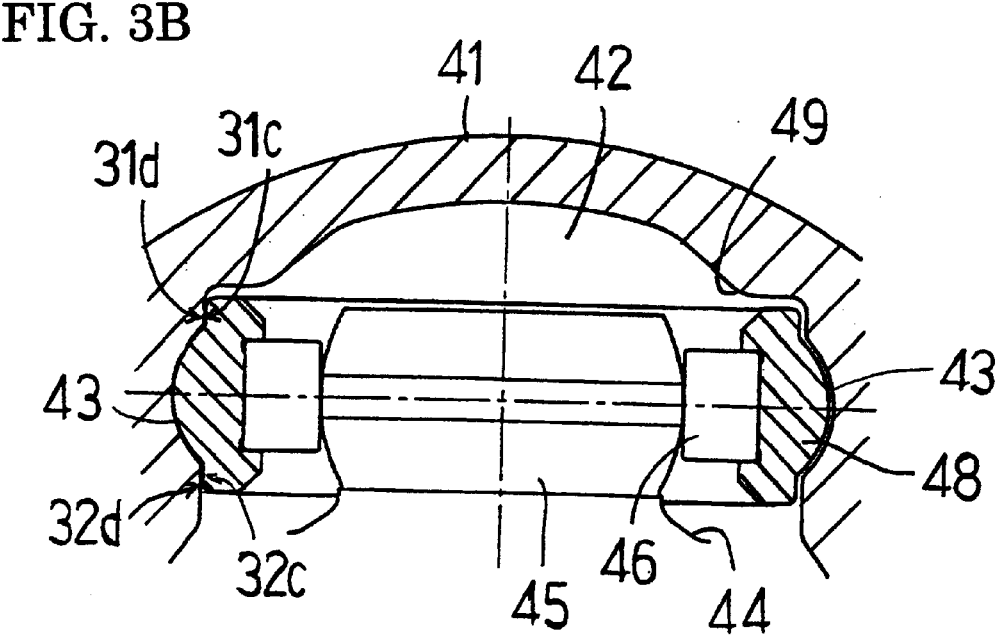
Figure 11:
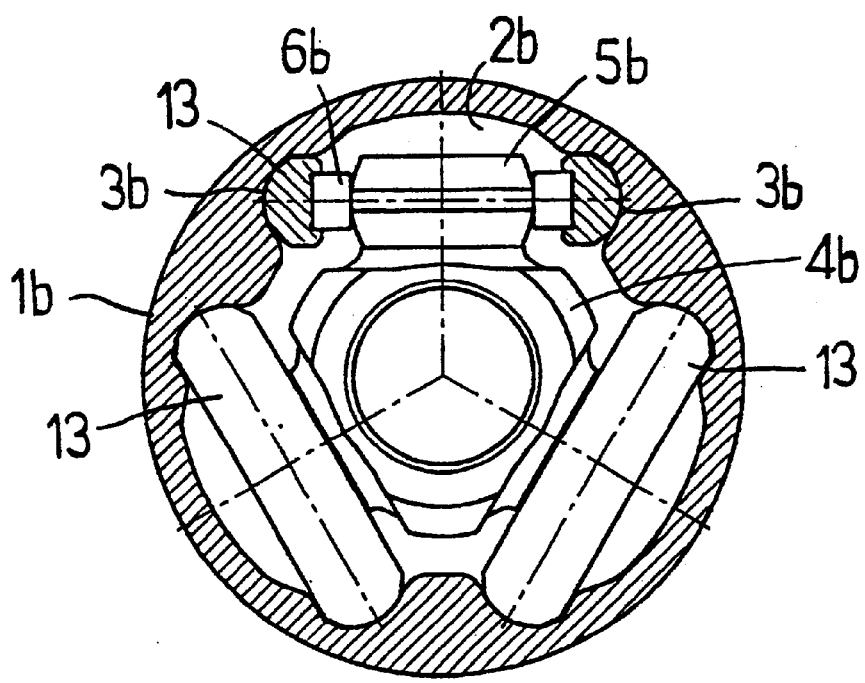
FIG. 11 is a cross sectional view of another conventional tripod type constant velocity universal joint.

FIG. 3A shows an embodiment applied in the joint shown in FIG. 11, and as mentioned already in relation to FIG. 11, a roller 48 supported on a trunnion 45 of an inner joint member 44 is accommodated in a guide groove 42 of an outer joint member 41. The outer periphery of the trunnion 45 is substantially part-spherical, and a cylindrical inner periphery of the annular roller 48 is fitted externally on this outer periphery of the trunnion 45 through a plurality of rolling elements 46. The center of the outer periphery of the trunnion 45 is on the axis of the trunnion 45, and the roller 48 tilts along this spherical outer periphery. The outer periphery of the roller 48 is a convex surface, which a track surface 43 in section is complementary to. Cylindrical rest surfaces 31c and 32c are formed at both ends of the outer periphery of the roller 48, while flat rest surfaces 31d and 32d extending parallel to the guide groove are formed at both ends of the track surface 43. The function of the rest surfaces 31c, 32c, 31d and 32d is the same as that of the rest surfaces 31a, 31b, 32a and 32b in the embodiment of FIG. 1A. FIG. 3B shows a modification in which axially extending parallel shoulders 49 are formed in the guide groove 42 of the outer joint member 41. The function of the shoulders 49 is the same as that of the shoulders 29 in the embodiment of FIG. 1B.

Figure 4:
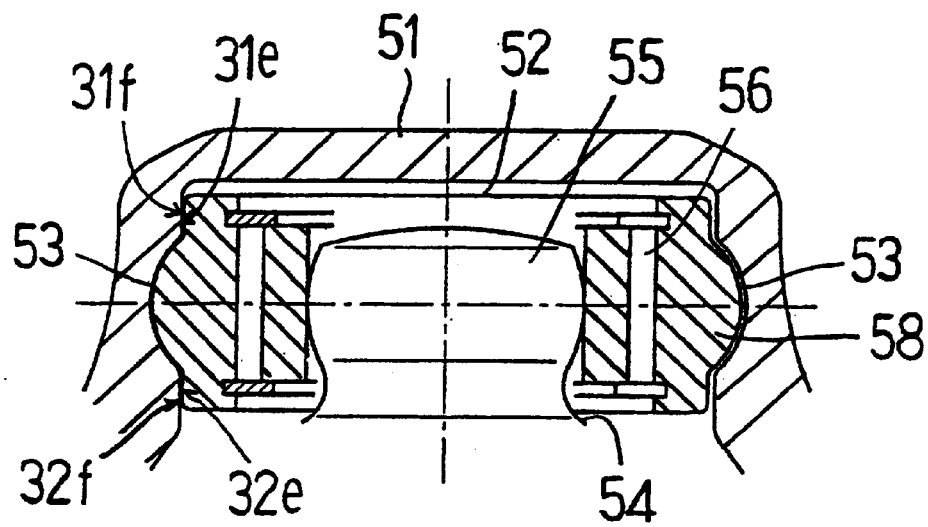
FIG. 4 is a partial sectional view showing a different embodiment of the invention.
Figure 12:
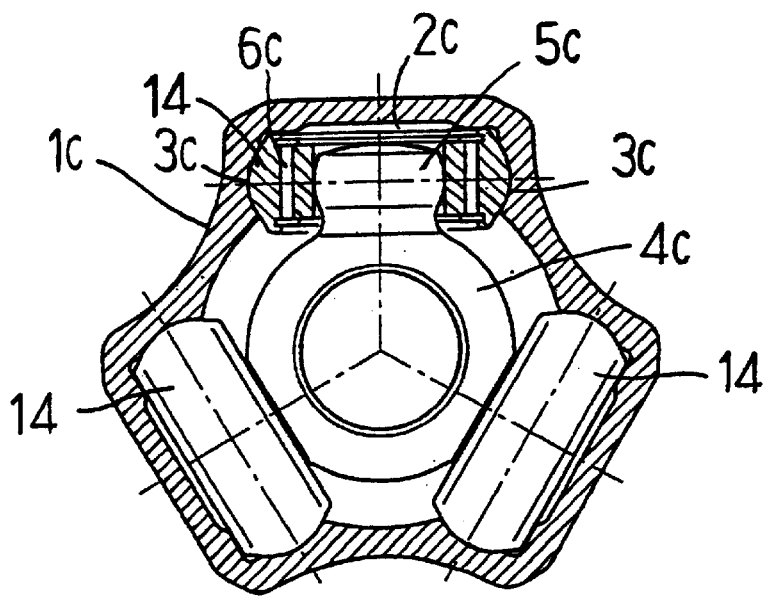
FIG. 12 is a cross sectional view of other conventional tripod type constant velocity universal joint.
Figure 13:
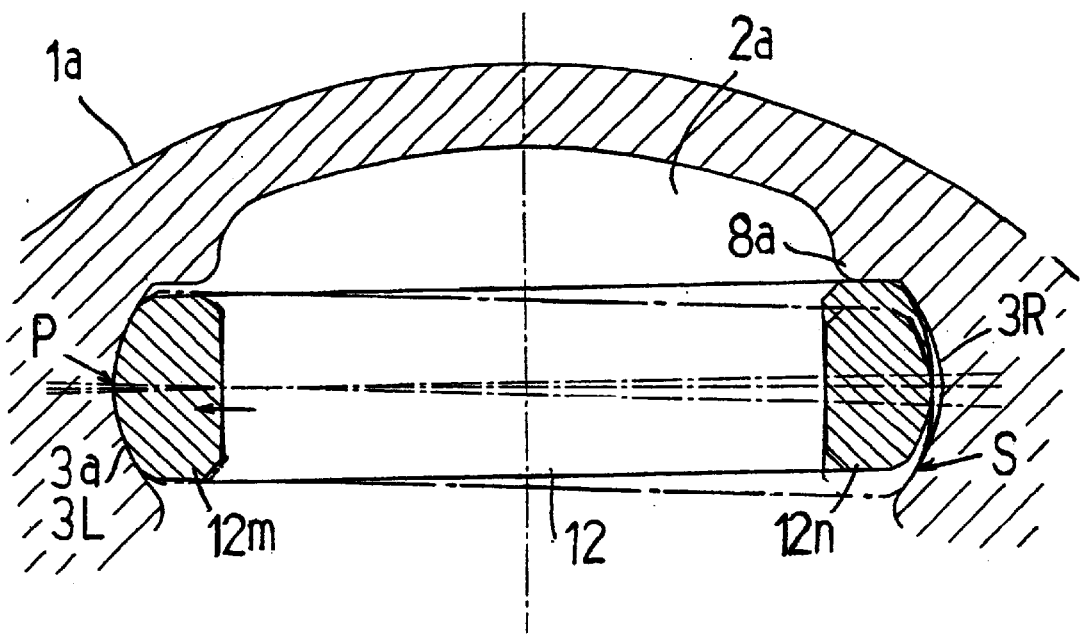
FIG. 13 is an enlarged sectional view of the outer ring and roller of the joint shown in FIG. 10.

FIG. 4 shows an embodiment applied in the joint shown in FIG. 12, and as mentioned already in relation to FIG. 12, a roller 58 supported on a trunnion 55 of an inner joint member 54 is accommodated in a guide groove 52 of an outer joint member 51. The outer periphery of the trunnion 55 is a truly part-spherical surface, and the annular roller 58 is fitted externally on this outer periphery through a plurality of rolling elements 56 so as to be rotatable and tiltable about the center of the truly part-spherical outer periphery of the trunnion 55. The outer periphery of the roller 58 is a convex surface, which a track surface 53 in section is complementary to. Cylindrical rest surfaces 31e and 32e are formed at both ends of the outer periphery of the roller 58, and corresponding flat rest surfaces 31f and 31f are formed on the track surface 53. The structure and function of the rest surfaces 31e, 32e, 31f and 32f are the same as in the embodiment of FIG. 1A.

Figure 5:
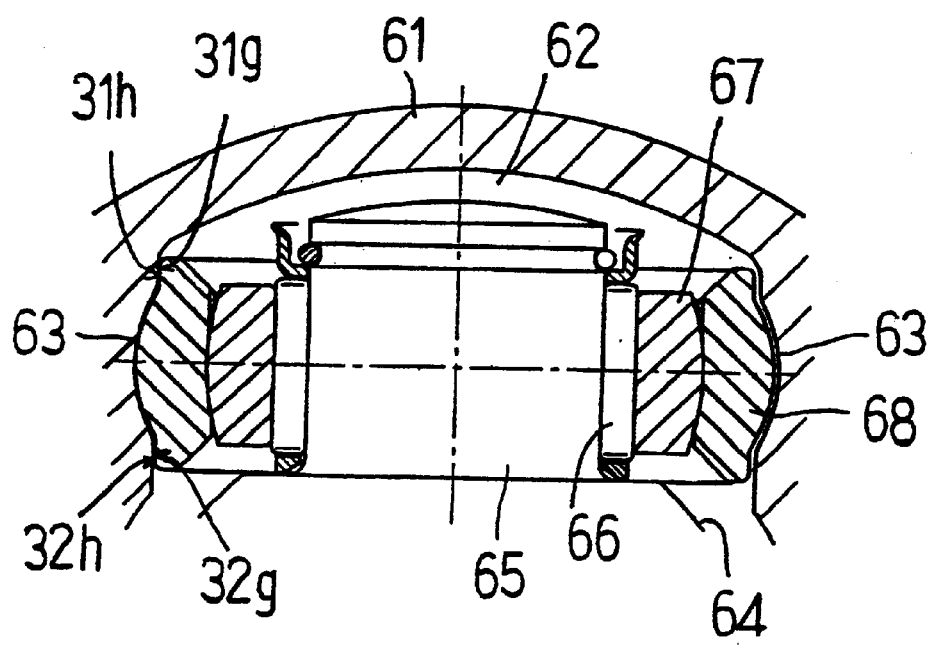
FIG. 5 is a partial sectional view showing a different embodiment of the invention.

The embodiment in FIG. 5 relates to a dual-roller structure of the joint shown in FIG. 1A in which inner and outer rollers are in contact with each other on the respective spherical surfaces. Therefore, the basic structure is the same as in FIG. 1A, that is, a roller 68 supported on a trunnion 65 of an inner joint member 64 is accommodated in a guide groove 62 of an outer joint member 61. An annular inner roller 67 is rotatably supported on the cylindrical outer periphery of the trunnion 65 through a plurality of rolling elements 66, and the part-spherical inner periphery of the outer roller 68 is externally fitted to the part-spherical outer periphery of the inner roller 67. The center of the part-spherical outer periphery of the inner roller 67 is on the axis of the trunnion 65, so that the outer roller 68 is tiltable along this part-spherical outer periphery. The center of the part-spherical inner periphery of the outer roller 68 and the center of the part-spherical outer periphery of the inner roller 67 are coincident with each other on the axis of the trunnion 65. At both ends of the outer periphery of the outer roller 68 are formed cylindrical rest surfaces 31g and 32g and corresponding flat rest surfaces 31h and 32h are formed on the track surface 63. The structure and function of the rest surfaces 31g, 32g, 31h and 32h are the same as in the embodiment in FIG. 1A.

Figure 6A:
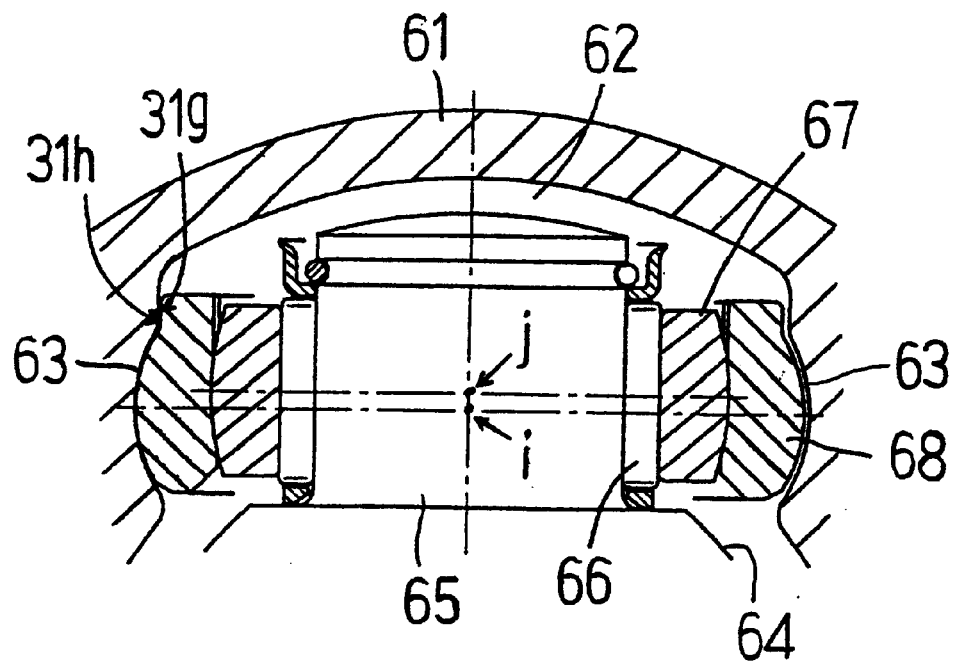
FIGS. 6A and 6B are partial sectional views showing other different embodiments of the invention, respectively.
Figure 6B:
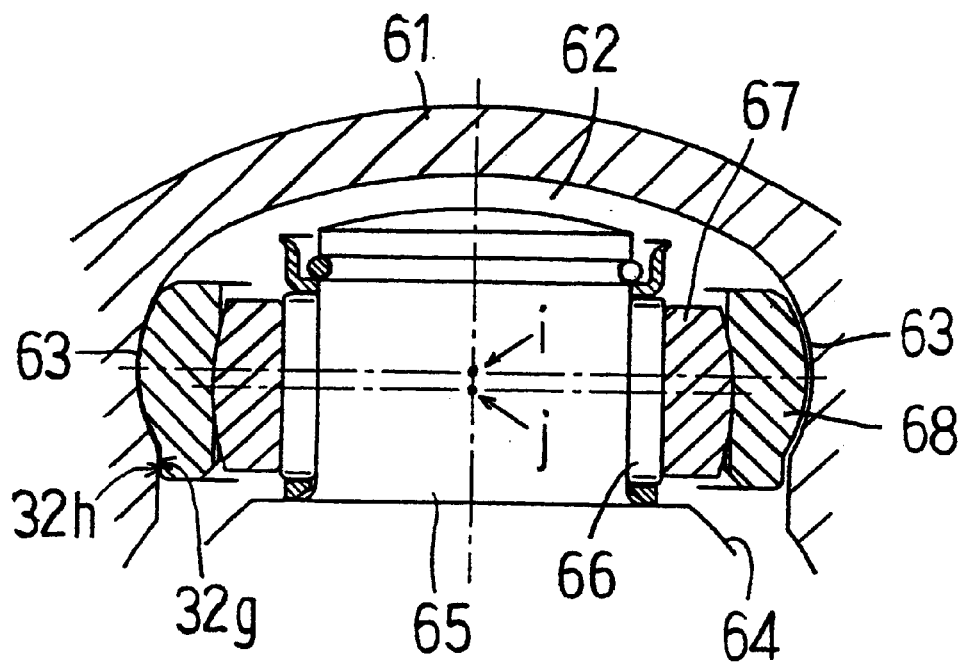

FIGS. 6A and 6B show modifications of the joint shown in FIG. 5. In the embodiment shown in FIG. 6A, the center (i) of the part-spherical outer periphery of the outer roller 68 on the axis of the trunnion 65 is lower than the center (j) of the part-spherical outer periphery of the inner roller 67 (also the center of the part-spherical inner periphery of the outer roller). In other words, the former is away from the latter radially inwardly of the inner joint member 64. In this joint, when loaded, the outer roller 68 can tilt so as to raise the non-load side radially outwardly of the outer joint member 61, thus requiring only the cylindrical rest surface 31g of the outer roller 68 and the flat rest surface 31h of the track surface 63 both situated radially outwardly of the outer joint member. In the embodiment shown in FIG. 6B, on the other hand, the center (i) of the part-spherical outer periphery of the outer roller 68 on the axis of the trunnion 65 is higher than the center (j) of the part-spherical outer periphery of the inner roller 67 (also the center of the part-spherical inner circumference of the outer roller) in the drawing. In other words, the former is away from the latter radially outwardly of the inner joint member 64. In this joint, when loaded, the outer roller 68 can tilt so as to lower the non-load side radially inwardly of the outer joint member 61, thus requiring only the cylindrical rest surface 32g of the outer roller 68 and the flat rest surface 32h of the track surface 63 both situated radially inwardly of the outer joint member.

Figures 8A, 8B, 8C:
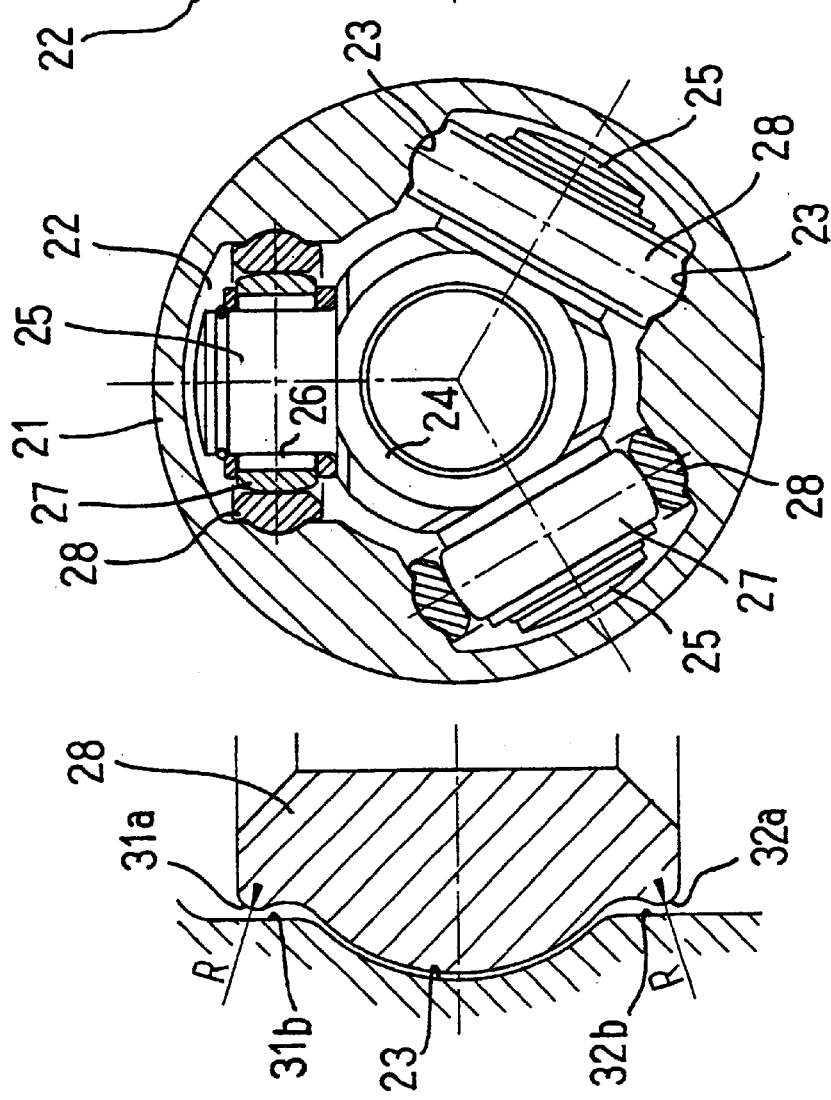
FIG. 8A is a cross sectional view showing still a further different embodiment of the invention.
FIG. 8B is a longitudinal sectional view of the joint shown in FIG. 8A in an articulated state.
FIG. 8C is an enlarged sectional view of the rest surfaces.
Figure 9A:
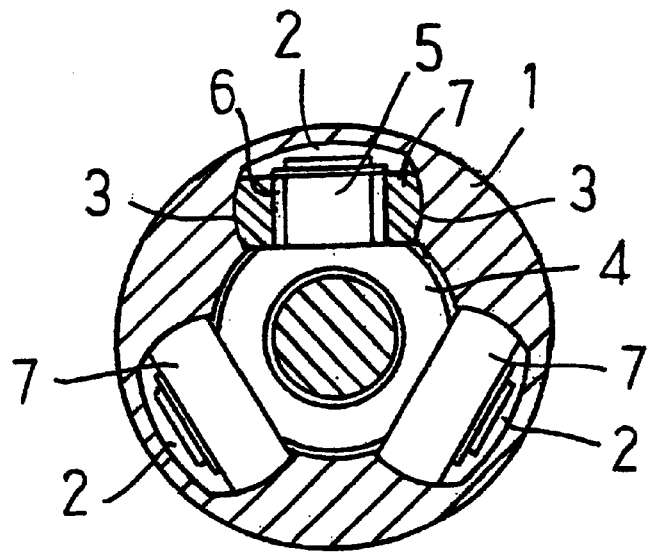
FIG. 9A is a cross sectional view of a conventional constant velocity universal joint of the tripod type.
Figure 9B:
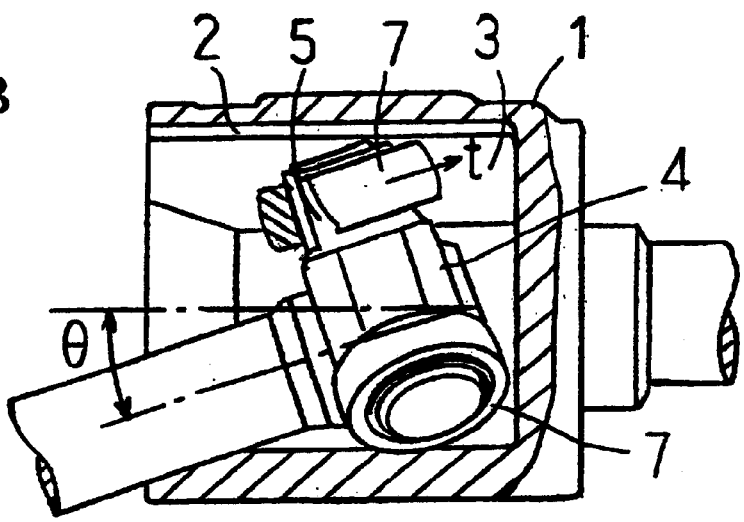
FIG. 9B is a longitudinal sectional view of the joint shown in FIG. 9A.
Figure 9C:
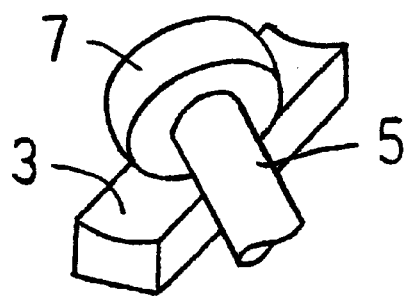
FIG. 9C is a perspective view, schematically illustrating the roller and track surface shown in FIG. 9B.

In the foregoing embodiments, the rest surfaces are shown as being straight in section, but not necessarily be so limited. As shown in FIG. 7 and FIG. 8, for example, one of the cooperating rest surfaces may be straight in section and the other curved. Such arrangement of the sectional shape of rest surfaces may be applied in any embodiment shown in FIG. 1 through FIG. 6, and as typical examples, applications in the embodiment in FIG. 1A are shown in FIG. 7 and FIG. 8. That is, in the embodiment shown in FIGS. 7A to 7C, the rest surfaces 31a and 32a of the outer roller 28 are cylindrical, while the rest surfaces 31b and 32b adjacent to the track surface 23 of the outer joint member 21 are convex. In this case, the generatrix of the outer periphery of the outer roller 28 is composed of the central convex arc and the straight lines at both ends. In the embodiment shown in FIG. 8, the rest surfaces 31b and 32b of the outer joint member 21 are flat, while the rest surfaces 31a and 32a of the outer roller 28 are convex. In this case, the generatrix of the outer periphery of the outer roller 28 is composed of the central larger arc and the smaller arcs at both ends. The larger and smaller convex arcs are smoothly connected via concave arcs. Since one of the cooperating rest surfaces is straight in section and the other curved, the area of contact therebetween decreases, and even if the outer roller 28 moves along the guide groove 22 axially of the outer joint member with the cooperating rest surfaces in contact with each other, only a slight sliding friction is generated, which contributes to reduction in slide resistance.

What is claimed is:

1. A tripod type constant velocity universal joint comprising:
   an outer joint member having equally spaced three guide grooves extending parallel to a rotational axis thereof, each of the guide grooves forming circumferentially opposed tracks;
   an inner joint member disposed inside the outer member and having three equally spaced trunnions projecting radially outwardly into the guide grooves; and
   an annular roller rotatably and tiltably carried by each of the trunnions,
   wherein a convex part-spherical outer periphery of the annular roller is engageable with the tracks of the corresponding guide groove so that the roller rolls therealong, and wherein cooperating rest surfaces for preventing the annular roller from tilting in a plane perpendicular to the axis of the outer joint member are provided at, respectively, an end portion of the annular roller and a portion of the track surface corresponding to said end portion of the roller, wherein said rest surfaces of said annular roller are cylindrical in section.

2. A tripod type constant velocity universal joint of claim 1, wherein said annular roller is an outer roller having a concave part-spherical inner periphery and is externally fitted rotatably and tiltably on a convex part-spherical outer periphery of an inner roller rotatably fitted on a cylindrical outer periphery of the trunnion through rolling elements.

3. A tripod type constant velocity universal joint of claim 2, wherein the center of the convex part-spherical outer periphery of said outer roller is away from the center of the convex part-spherical outer periphery of said inner roller on the axis of the trunnion.

4. A tripod type constant velocity universal joint of claim 1, wherein said annular roller has a cylindrical inner periphery, and is externally fitted on a substantially part-spherical outer periphery of the trunnion through rolling elements.

5. A tripod type constant velocity universal joint of claim 1, wherein the generatrix of the outer periphery of the annular roller is composed of a convex arc and a straight line, and the track surface in section is composed of a concave arc and a convex arc.

6. A tripod type constant velocity universal joint of claim 1, wherein the generatrix of the outer periphery of the annular roller is composed of convex arcs of different radius of curvature, and the track surface in section is composed of a concave arc and a straight line.

7. A tripod type constant velocity universal joint comprising:

an outer joint member having equally spaced three guide grooves extending parallel to a rotational axis thereof, each of the guide grooves forming circumferentially opposed tracks;

an inner joint member disposed inside the outer member and having three equally spaced trunnions projecting radially outwardly into the guide grooves; and an annular roller rotatable and tiltably carried by each of the trunnions, wherein a convex part-spherical outer periphery of the annular roller is engageable with the tracks of the corresponding guide groove so that the roller rolls therealong, and wherein cooperating rest surfaces for preventing the annular roller from tilting in a plane perpendicular to the axis of the outer joint member are provided at, respectively, an end portion of the annular roller and a portion of the track surface corresponding to said end portion of the roller, wherein at least one of said cooperating rest surfaces is straight in section and the remaining of the other of said cooperating rest surfaces are curved in section.

8. A tripod type constant velocity universal joint of claim 7, wherein the generatrix of the outer periphery of the annular roller is composed of a convex arc and a straight line, and the track surface in section is composed of a concave arc and a convex arc.

9. A tripod type constant velocity universal joint of claim 7, wherein the generatrix of the outer periphery of the annular roller is composed of convex arcs of different radius of curvature, and the track surface in section is composed of a concave arc and a straight line.

10. The tripod type constant velocity universal joint of claim 7, wherein said annular roller is an outer roller having a concave part-spherical inner periphery and is externally fitted rotatably and tiltably on a convex part-spherical outer periphery of an inner roller, rotatably fitted on a cylindrical outer periphery of the trunnion through rolling elements.

11. A tripod type constant velocity universal joint of claim 7, wherein the center of the convex part-spherical outer periphery of said outer roller is away from the center of the convex part-spherical outer periphery of said inner roller on the axis of the trunnion.

12. A tripod type constant velocity universal joint of claim 7, wherein said annular roller has a cylindrical inner periphery, and is externally fitted on a substantially part-spherical outer periphery of the trunnion through rolling elements.

* * * * *